(12) United States Patent
Tucker et al.

(10) Patent No.: US 12,437,093 B1
(45) Date of Patent: Oct. 7, 2025

(54) SECURE MULTI-PARTY EPHEMERAL FILE TRANSFER

(71) Applicant: ComplyAuto IP LLC, Salt Lake City, UT (US)

(72) Inventors: Zachary Brian Tucker, Grand Junction, CO (US); Casey Andrew Graff, Sandy, UT (US)

(73) Assignee: ComplyAuto IP LLC, Salt Lake City, UT (US)

( * ) Notice: Subject to any disclaimer, the term of this patent is extended or adjusted under 35 U.S.C. 154(b) by 0 days.

(21) Appl. No.: 19/172,364

(22) Filed: Apr. 7, 2025

Related U.S. Application Data

(60) Provisional application No. 63/631,360, filed on Apr. 8, 2024.

(51) Int. Cl.
*G06F 21/31* (2013.01)
*G06F 21/60* (2013.01)
*G06F 21/62* (2013.01)

(52) U.S. Cl.
CPC .......... *G06F 21/6209* (2013.01); *G06F 21/31* (2013.01); *G06F 21/604* (2013.01)

(58) Field of Classification Search
CPC ..... G06F 21/6209; G06F 21/31; G06F 21/604
See application file for complete search history.

(56) References Cited

U.S. PATENT DOCUMENTS

| | | | |
|---|---|---|---|
| 10,469,463 B2 | 11/2019 | Falk | |
| 10,999,259 B2 | 5/2021 | Falk | |
| 2005/0240467 A1* | 10/2005 | Eckart | G06Q 40/12 705/30 |
| 2013/0232239 A1* | 9/2013 | Akiyama | H04L 41/0889 709/220 |
| 2014/0189820 A1* | 7/2014 | Pieczul | G06F 21/31 726/5 |
| 2014/0189888 A1* | 7/2014 | Madhok | H04L 63/102 726/29 |
| 2018/0139355 A1* | 5/2018 | Watanabe | H04N 1/00344 |
| 2019/0158497 A1* | 5/2019 | Diaz Cuellar | H04L 63/108 |
| 2019/0386981 A1* | 12/2019 | Ramesh Kumar | H04L 9/3228 |
| 2020/0314167 A1* | 10/2020 | Achyuth | G06F 9/45545 |
| 2020/0349639 A1* | 11/2020 | Mousseau | H04L 67/02 |
| 2022/0222363 A1* | 7/2022 | Rupawalla | G06F 21/31 |

* cited by examiner

*Primary Examiner* — Vance M Little

(74) *Attorney, Agent, or Firm* — Knobbe, Martens, Olson & Bear, LLP

(57) ABSTRACT

A system, responsive to successfully authenticating a requestor user, can receive sender user information of a sender user, generate a link corresponding to a file repository, generate a packet, wherein the packet corresponds to a location at the file repository where a file uploaded responsive to interaction with an upload link is stored, generate a packet access token that comprises a packet identifier associated with the packet, embed the packet access token with the link to create the upload link, wherein the upload link is associated with the packet; and output the upload link to enable the sender user to access the packet to upload the file to the location at the file repository that corresponds to the packet. Once the sender user uploads the file using the upload link, a file access link can be provided to a recipient user to access the file.

27 Claims, 6 Drawing Sheets

SECURE MULTI-PARTY EPHEMERAL FILE TRANSFER

INCORPORATION BY REFERENCE

The present application claims priority to U.S. Provisional Application No. 63/631,360, filed on Apr. 8, 2024, the disclosure of which is hereby incorporated by reference in its entirety and for all purposes herein. Any and all applications for which a foreign or domestic priority claim is identified in the Application Data Sheet as filed with the present application are hereby incorporated by reference under 37 CFR 1.57.

TECHNICAL FIELD

The present disclosure generally relates to secure file transfer. More specifically, the present disclosure relates to secure file transfer of ephemeral files or files that are available for a limited period of time from a file repository.

BACKGROUND

It is common for different users of an entity to share data or files with other users of the entity. In some cases, the users are owners, employees, customers, or a combination of any of the aforementioned. Some of the data or files may be sensitive and it may be desirable to limit access to the files to certain users and/or for a limited time period.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to a method of secure file transfer of a file with limited access duration, the method including: by a hardware processor of an interactive computing system, receiving an indication that a requestor user interacted with an entity link associated with an entity; outputting an authentication request to obtain authentication information from the requestor user; receiving the authentication information from the requestor user; and responsive to successfully authenticating the requestor user based at least in part on the authentication information, the method further includes: receiving sender user information of a sender user; generating a link corresponding to a file repository; generating a packet, wherein the packet corresponds to a location at the file repository where a file uploaded responsive to interaction with an upload link is stored; generating a packet access token that includes a packet identifier associated with the packet; embedding the packet access token with the link to create the upload link, wherein the upload link is associated with the packet; outputting the upload link to enable the sender user to access the packet to upload the file to the location at the file repository that corresponds to the packet; determining that the file has been uploaded to the location at the file repository; and responsive at least in part to determining that the file has been uploaded to the location at the file repository, alerting a recipient that the file has been uploaded, wherein the recipient is a different user than the requestor user.

In some aspects, the techniques described herein relate to a method, further including: receiving an indication that the sender user interacted with the upload link; determining that the packet access token embedded with the upload link is a modify packet token, wherein the modify packet token permits a user to modify files associated with the packet; and responsive to determining that the packet access token is the modify packet token, the method further including: retrieving the packet identifier from the packet access token; accessing a packet status associated with the packet; and determining whether the packet status indicates that the packet is empty.

In some aspects, the techniques described herein relate to a method, wherein, responsive to determining that the packet status indicates that the packet is not empty, denying the sender user with access to the packet.

In some aspects, the techniques described herein relate to a method, wherein, responsive to determining that the packet status indicates that the packet is empty, the method further includes: receiving the file from a sender computing system; storing the file at the location at the file repository; associating the file with the packet; modifying the packet status to indicate that the packet is not empty; identifying the recipient associated with the packet; and alerting the recipient that the file has been uploaded to the file repository.

In some aspects, the techniques described herein relate to a method, further including receiving a submit indicator associated with receiving the file from the sender computing system, wherein the packet status is modified to indicate that the packet is not empty in response to receiving the submit indicator.

In some aspects, the techniques described herein relate to a method, further including: generating a view access token that includes the packet identifier associated with the packet; and generating a file access link associated with the packet, wherein the file access link includes the view access token, and wherein alerting the recipient includes providing the recipient with the file access link.

In some aspects, the techniques described herein relate to a method, wherein the view access token enables the recipient to view or download the file associated with the packet.

In some aspects, the techniques described herein relate to a method, wherein the view access token does not permit the recipient to upload files to the location at the file repository.

In some aspects, the techniques described herein relate to a method, further including: receiving an indication that the recipient interacted with the file access link; determining that a packet access token embedded with the file access link is the view access token; validating the view access token; responsive to determining that the view access token is valid, authenticating the recipient; and responsive to determining that the recipient is successfully authenticated, providing access to the file associated with the packet.

In some aspects, the techniques described herein relate to a method, wherein authenticating the recipient includes: determining whether the packet requires multifactor authentication; and responsive to determining that the packet requires multifactor authentication, initiating a multifactor authentication process to authenticate the recipient.

In some aspects, the techniques described herein relate to a method, wherein validating the view access token includes determining that a time-to-live value associated with the view access token has not expired.

In some aspects, the techniques described herein relate to a method, wherein validating the view access token includes determining whether a network address associated with a recipient computing system that provided the indication that the recipient interacted with the file access link is on a whitelist.

In some aspects, the techniques described herein relate to a method, wherein associating the file with the packet includes associating the packet with the location at which the file is stored at the file repository.

In some aspects, the techniques described herein relate to a method, further including: determining that a time-to-live value associated with at least one of the packet or the file has expired; and deleting at least one of the packet or the file from the file repository.

In some aspects, the techniques described herein relate to a method, wherein, responsive to successfully authenticating the requestor user based at least in part on the authentication information, the method further includes: generating an access token at a backend system, wherein the access token is not presented to a user; and transmitting the access token to a front end system, wherein the access token enables the front end system to communicate with the backend system.

In some aspects, the techniques described herein relate to a method, wherein the access token is associated with a time-to-live value.

In some aspects, the techniques described herein relate to a system configured to implement a secure file transfer of a file with a limited time duration, the system including: a file repository configured to store a file for at least a limited time duration; and a hardware processor configured to at least: receive an indication that a requestor user interacted with an entity link associated with an entity; output an authentication request to obtain authentication information from the requestor user; receive the authentication information from the requestor user; and responsive to successfully authenticating the requestor user based at least in part on the authentication information, the hardware processor is further configured to at least: receive sender user information of a sender user; generate a link corresponding to a file repository; generate a packet, wherein the packet corresponds to a location at the file repository where a file uploaded responsive to interaction with an upload link is stored; generate a packet access token that includes a packet identifier associated with the packet; embed the packet access token with the link to create the upload link, wherein the upload link is associated with the packet; and output the upload link to enable the sender user to access the packet to upload the file to the location at the file repository that corresponds to the packet.

In some aspects, the techniques described herein relate to a system, wherein the hardware processor is further configured to at least: receive an indication that the sender user interacted with the upload link; determine that the packet access token embedded with the upload link is a modify packet token, wherein the modify packet token permits a user to modify files associated with the packet; and responsive to determining that the packet access token is the modify packet token, the hardware processor is further configured to: retrieve the packet identifier from the packet access token; access a packet status associated with the packet; and determine whether the packet status indicates that the packet is empty.

In some aspects, the techniques described herein relate to a system, wherein, responsive to determining that the packet status indicates that the packet is not empty, the hardware processor is further configured to at least deny the sender user with access to the packet.

In some aspects, the techniques described herein relate to a system, wherein, responsive to determining that the packet status indicates that the packet is empty, the hardware processor is further configured to at least: receive the file from a sender computing system; store the file at the location at the file repository; associate the file with the packet; modify the packet status to indicate that the packet is not empty; identify a recipient associated with the packet; and alert the recipient that the file has been uploaded to the file repository.

In some aspects, the techniques described herein relate to a system, wherein the hardware processor is further configured to at least receive a submit indicator associated with receiving the file from the sender computing system, wherein the packet status is modified to indicate that the packet is not empty in response to receiving the submit indicator.

In some aspects, the techniques described herein relate to a system, wherein the hardware processor is further configured to at least: generate a view access token that includes the packet identifier associated with the packet; and generate a file access link associated with the packet, wherein the file access link includes the view access token, wherein alerting the recipient includes providing the recipient with the file access link.

In some aspects, the techniques described herein relate to a system, wherein the view access token enables the recipient to view or download the file associated with the packet.

In some aspects, the techniques described herein relate to a system, wherein the hardware processor is further configured to at least: receive an indication that the recipient interacted with the file access link; determine that a packet access token embedded with the file access link is the view access token; validate the view access token; responsive to determining that the view access token is valid, authenticate the recipient; and responsive to determining that the recipient is successfully authenticated, provide access to the file associated with the packet.

In some aspects, the techniques described herein relate to a system, wherein authenticating the recipient includes: determining whether the packet requires multifactor authentication; and responsive to determining that the packet requires multifactor authentication, initiating a multifactor authentication process to authenticate the recipient.

In some aspects, the techniques described herein relate to a system, wherein validating the view access token includes determining that a time-to-live value associated with the view access token has not expired.

In some aspects, the techniques described herein relate to a system, wherein validating the view access token includes determining whether an Internet Protocol address associated with a recipient computing system that provided the indication that the recipient interacted with the file access link is on a whitelist.

In some aspects, the techniques described herein relate to a system, wherein the recipient and the requestor user are different users.

In some aspects, the techniques described herein relate to a system, wherein associating the file with the packet includes associating the packet with the location at which the file is stored at the file repository.

In some aspects, the techniques described herein relate to a system, wherein the hardware processor is further configured to at least: determine that a time-to-live value associated with at least one of the packet or the file has expired; and delete at least one of the packet or the file from the file repository.

In some aspects, the techniques described herein relate to a system, wherein, responsive to successfully authenticating the requestor user based at least in part on the authentication information, the hardware processor is further configured to at least: generate an access token at a backend system; and transmit the access token to a front end system, wherein the access token enables the front end system to communicate with the backend system.

In some aspects, the techniques described herein relate to a system, wherein the backend system includes the hardware processor.

In some aspects, the techniques described herein relate to a system, wherein the access token is associated with a time-to-live value.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Aspects and advantages of the embodiments provided herein are described with reference to the following detailed description in conjunction with the accompanying drawings. Throughout the drawings, reference numbers may be reused to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Further, one or more features or structures can be removed or omitted.

DETAILED DESCRIPTION OF CERTAIN EMBODIMENTS

Figure 1:
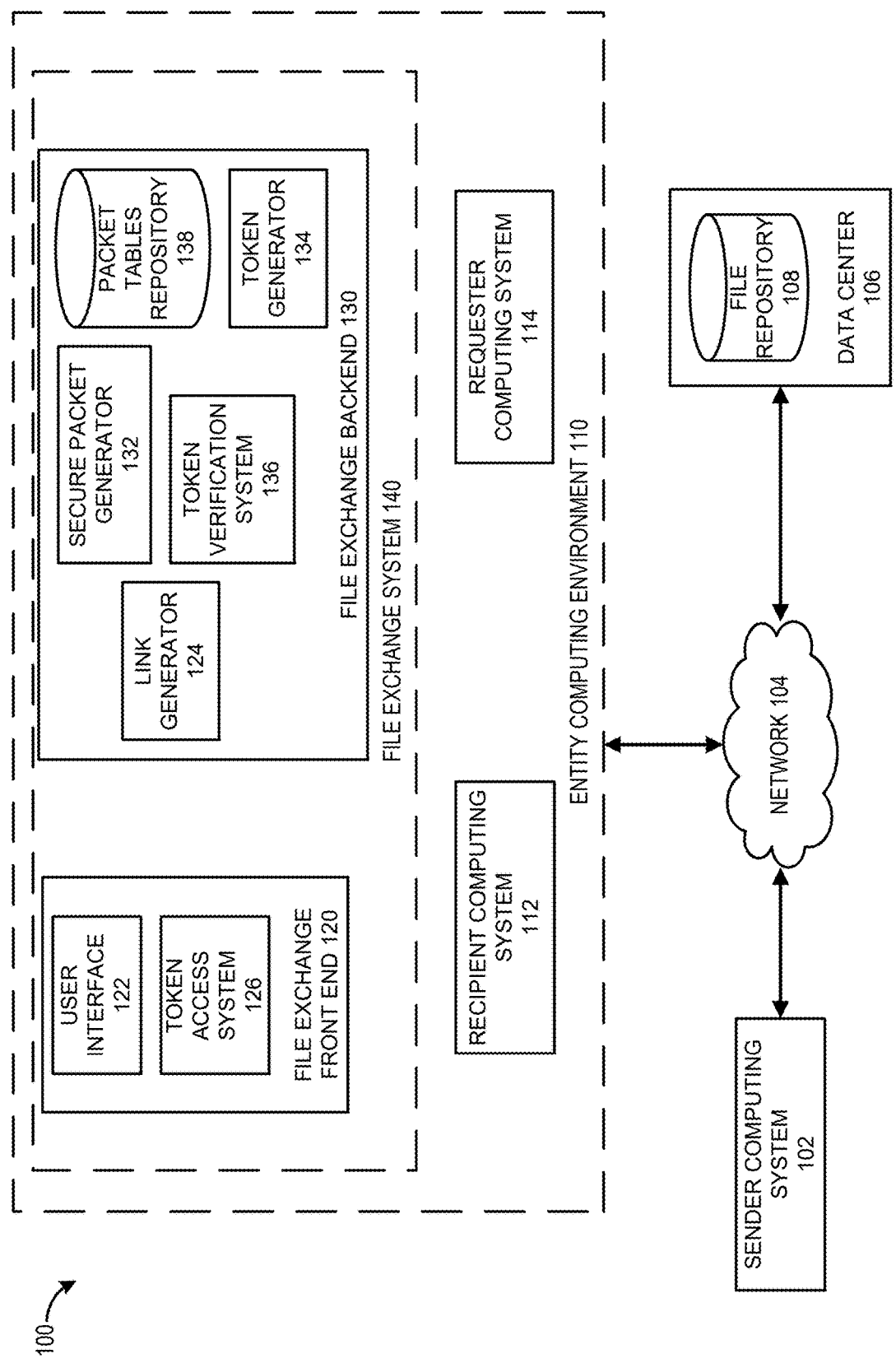
FIG. 1 illustrates an example interactive computing environment in accordance with certain embodiments.

The headings provided herein, if any, are for convenience only and do not necessarily affect the scope or meaning of the claimed invention.

INTRODUCTION

It can be desirable for users to share data or files. Often, the data or files are shared within a computing environment. In other words, the data or files may be digital data or converted from an analog format (e.g., paper documents) to a digital format (e.g., scanned documents, photographs, or data typewritten into a digital document). In some cases, it is desirable for the data or files to be shared in a secure manner and/or with a limited number of users. Moreover, it can be desirable for the data or files to be ephemeral or available for a limited period of time. In other words, it can be desirable in certain circumstances for files or data to be stored in a digital repository for a limited period of time (e.g., a day, a week, until a recipient user views or accesses the data or file, etc.). To simplify discussion, the present application will generally use the term "file" to refer to any type of digital data or information that may be accessible via a computing system. However, it should be understood that the present disclosure is not limited to data that is stored in a file and may refer to any type of digital data that may be shared over a computing network including text, metadata, images, and the like.

Some existing file exchange systems provide file access to users (e.g., a requesting user) that request files from other users (e.g., sender users). In other words, the requesting user can also be a recipient user. However, in some cases, it is desirable for a user that requests a file (e.g., a requesting user) to not have access to the file. In other words, in some cases, it is desirable for a requesting user to not be a recipient user. For example, in some cases, the file may include sensitive data (e.g., financial information, unique identifying information (e.g., a social security number), legal information, trade secrets, and the like). In some such cases, it may be desirable to have users who do not require or should not have access to the sensitive data request the data on behalf of a user that may require or be permitted to access the sensitive data. For example, a car salesman may request financial information to complete a loan application as part of a car sales process, but it may be desirable that the car salesman not have access to the financial information. Instead, it may be desirable that the financial information be viewed by the loan processing department of the car dealership. As another example, it may be desirable that a legal assistant request sensitive documents (e.g., a confidential settlement agreement) from a client relating to a legal matter, but that only the client's attorney have access to view the documents.

Embodiments disclosed herein provide a file exchange system that enables a requester user to request files from a sender user. Further, the file exchange system enables the sender user to provide access to files to a recipient in response to the requester user's file request without the requester user obtaining access to the files.

Often, files that are exchanged via a file exchange system are stored in a nonvolatile memory or storage location indefinitely or for at least a fixed period of time, which may be determined by an organization's retention policy. Storing files indefinitely or for a fixed period of time enables the files to be accessed multiple times. Further, certain file exchange systems enable any authorized user to access the files any number of times. In some cases, it is desirable to exchange files without storing the files in a nonvolatile memory or for longer than necessary to access the file once. Embodiments disclosed herein provide a file exchange system that enables a sender to send files to a recipient without the files being stored in a nonvolatile memory, or for longer than the time sufficient for the recipient to receive the files. In other words, any storage of the files may be ephemeral.

The present disclosure primarily describes communicating information (e.g., data or files) between users who are affiliated with an entity (e.g., a business, a university, a government organization, etc.) and users who are not affiliated with the entity. However, embodiments of the present disclosure may be used to communicate data or files between users of an entity. Further, embodiments of the present disclosure may be used to communicate data or files between private individuals, or users that are unaffiliated with a particular entity.

Example Computing Environment

FIG. 1 illustrates an example interactive computing environment 100 in accordance with certain embodiments. The interactive computing environment 100 can include an entity computing environment 110, a data center 106, and a sender computing system 102. The entity computing environment 110 may include a recipient computing system 112, a requester computing system 114, and a file exchange system 140.

The entity computing environment 110 may include a computing environment of any type of entity that may host or otherwise use the file exchange system 140 to facilitate an exchange of files. In some cases, the entity computing environment 110 may be a computing environment of a user. However, typically the entity computing environment 110 is a computing environment of an entity or organization, such as a car dealership, a law firm, a government entity, a technology firm, or any other type of entity that may desire to request or exchange files in a secure manner and/or to limit access to requested files. The entity computing environment 110 may be a distributed environment and the file exchange system 140, the recipient computing system 112, and the requester computing system 114 may each be located in different physical locations. Further, in some cases, the file exchange system 140 may be hosted by a different entity than the entity computing environment 110. In such cases, the entity associated with the entity computing environment 110 may purchase, lease, or otherwise obtain access to the file exchange system 140.

FIG. 1 illustrates the recipient computing system 112 and the requester computing system 114 as part of the entity computing environment 110 and the sender computing system 102 as external to the entity computing environment 110. However, it is within the scope of the present disclosure that the sender computing system 102 may be part of the entity computing environment 110 and/or the recipient computing system 112 may be separate from the entity computing environment 110. In other words, in some cases, the sender of files may be associated or affiliated with the entity of the entity computing environment 110 (e.g., an employee) and the recipient of files (e.g., a customer or client) may be independent (e.g., not an employee) of the entity of the entity computing environment 110. Thus, it is envisioned that any of the sender computing system 102, the recipient computing system 112, or the requester computing system 114 may be part of the entity computing environment 110 or separate from the entity computing environment 110 depending on which users are requesting, sending, or receiving information.

The sender computing system 102 may include any computing system associated with or accessible by a sender user or sender who may send requested files to a recipient. The recipient computing system 112 may include any computing system associated with or accessible by a recipient user or recipient who may receive files from the sender. The requester computing system 114 may include any computing system associated with or accessible by a requester user or requester who may request files from the sender. The file exchange system 140 may include any computing system or systems that may facilitate the exchange of files between the sender and the recipient using one or more of the embodiments described herein.

The file exchange system 140 may be implemented in a single computing system. Alternatively, the file exchange system 140 may be distributed among multiple computing systems. For example, the file exchange system 140 may include a file exchange front end 120 and a file exchange backend 130, which may each be implemented using one or more separate computing systems to implement the subsystems described herein. In certain embodiments, the file exchange front end 120 enables a user to interact with (e.g., via a user interface of the file exchange front end 120 or via a computing system that communicates with the file exchange front end 120) the file exchange system 140. Further, in certain embodiments, the user may not directly interact with the file exchange backend 130. However, the user may, in some cases, indirectly interact with the file exchange backend 130 via the file exchange front end 120. In some cases, the file exchange front end 120 may be located in a different physical or computing environment than the file exchange backend 130. In other cases, the file exchange front end 120 and the file exchange backend 130 may be located within the same physical or computing environment.

The file exchange system 140 is illustrated as being included in the entity computing environment 110. However, in some embodiments, the file exchange system 140 may be separate from the entity computing environment 110. For example, the file exchange system 140 may be hosted by or managed by a separate entity from the entity associated with the entity computing environment 110. In some such cases, the entity associated with the entity computing environment 110 may obtain (e.g., purchase, lease, etc.) access to the file exchange system 140 (e.g., as a service) to enable secure file transfer.

Upon desiring to obtain a file from a sender, a requester may interact with the file exchange system 140 via a requester computing system 114 to generate a file request link or an upload link. This upload link may be associated with a recipient and a packet. Notably, the upload link may not be associated with the requester and accordingly, in certain embodiments, the requester may not be able to access files uploaded by the sender. The packet may be an identifier that can be used to link or associate uploaded files received from the sender to a storage location within a repository (e.g., the file repository 108) and/or the recipient. The requester can provide the generated link to a sender. Interacting with the generated link via the sender computing system 102 the sender can upload one or more files requested by the requester. Upon the files being uploaded, the recipient may be notified that the files have been uploaded and may access the files via a file access link.

The file exchange front end 120 may include a user interface 122 and a token access system 126. The file exchange backend 130 may include a link generator 124, a secure packet generator 132, a token generator 134, a token verification system 136, and a packet tables repository 138. In certain implementations, one or more of the subsystems of the file exchange front end 120 may be included as part of the file exchange backend 130 and vice versa. Further, one or more of the subsystems of the file exchange front end 120 and/or the file exchange backend 130 may be combined into one system or divided into multiple subsystems.

The user interface 122 may include any system capable of generating a user interface that enables a user to interact with the file exchange front end 120 of the file exchange system 140. The user interface 122 may include a graphical user interface and/or a text-based interface. Further, the user interface 122 may be output for display on a browser, as part of a native application interface, or as part of any other type of interface that enables a user to interact with the file exchange system 140. Moreover, the user interface 122 may enable a user to enter information, upload a file, download a file, view a file, or otherwise access information.

The link generator 124 may include any system capable of generating a link that provides a user (e.g., a sender) with access to a secure portal to upload files. Further, the link generator 124 may include any system capable of generating a link that provides a user (e.g., a recipient) with access to a secure portal to access files that have been uploaded via the file exchange system 140. In some cases, the link generator 124 may generate a link that enables a user (e.g., a requester) to access the file exchange system 140 and/or an account associated with the file exchange system 140 to create a packet and/or generate a link for enabling file exchange. In some cases, the link that enables a user to access the file exchange system 140 may be associated with an entity or organization that implements or uses the file exchange system 140 to enable file transfer. The file exchange backend 130 may provide the link generated by the link generator 124 to the file exchange front end 120, which enables the link to be presented to a user via, for example, the user interface 122.

The token access system 126 may include any system capable of accessing a token embedded in a link. The token may indicate a time of access a user is granted to a packet. This packet access may further be based on authentication of the user.

In some embodiments, at least some of the file exchange front end 120 may be implemented on one or more of the recipient computing system 112, the requester computing system 114, and/or the sender computing system 102. For example, the user interface 122 and/or the token access system 126 may be implemented on any of the aforementioned computing systems.

The file exchange backend 130 may include a secure packet generator 132, a token generator 134, a token verification system 136, and a packet tables repository 138. The secure packet generator 132 may include any system that can generate a packet. As indicated above, a packet may be an identifier that is used to link or associate uploaded files with each other, with a storage location, and/or with a user. Generating the packet may include obtaining a new unique identifier. This unique identifier may be registered in a data structure, such as a table. The unique identifier can be associated with one or more of a file, a storage location, and/or a user within the table. This table and/or the packet may be stored within the packet tables repository 138. Throughout the present disclosure, the use of tables is described for storing certain pieces of data or for associating certain pieces of data with a reference. It should be understood that the table can be substituted with other types of data structures that enable data to be associated together or with a reference.

The token generator 134 can include any system that can generate a token. The token may be associated with one or more of the packet, a user, a communication session between the file exchange front end 120 and the file exchange backend 130, and/or an access permission or type. In some cases, the token generator 134 may generate different types of tokens. For example, the token generator 134 may generate a session or access token that enables the file exchange front end 120 to communicate with the file exchange backend 130 for a particular communication session. This session token may be a short-lived token (e.g., may have a time-to-live value of an hour or less) that grants the file exchange front end 120 access to the systems of the file exchange backend 130. Moreover, the session token may be generated in response to successful authentication of a user but, in some cases, may not be presented to the user.

As another example of a token, the token generator 134 may generate a packet access token that grants a user access to a packet, the files associated with the packet, and/or a storage associated with the packet. This packet access token may be associated with different access permissions. For example, the packet access token may grant an associated user access to a storage location to upload files. As another example, the packet access token may grant an associated user access to files associated with a packet enabling the user to view or download the associated files. In certain embodiments, each user or each user who is successfully authenticated may be granted or associated with a different token. As with the session token, the packet access token may be associated with a time-to-live value.

The token verification system 136 may include any system that can verify the token. Verifying the token may include determining whether the time-to-live value has expired. Further, verifying the token may include determining permissions associated with the token and/or determining whether a user is authorized to access the token (e.g., determine whether the identified user is associated with the token).

The packet tables repository 138 may include any database or nonvolatile memory that can store a packet and/or tables or other data structures that relate the packet to file and/or storage locations and/or that relate the packet to users. In some cases, the packet tables repository 138 may be located at or stored at the data center 106.

The data center 106 may store files associated with a packet in a file repository 108. These files may be temporarily stored at the file repository 108. The data center 106 may include any file storage solution that may be accessible by the entity computing environment 110 and that may be maintained by a third-party entity. In some cases, the data center 106 may be replaced by a storage solution maintained by the entity computing environment 110. After the files are accessed by the recipient, the files may be deleted. In some cases, the files are not associated with a fixed storage location. Accordingly, it may not be possible to access the files without determining a current location of the files. The determination of the current location of the files may be determined by access the packet associated with the files to determine a current storage location of the files.

In some embodiments, the file repository 108 may be located at the file exchange backend 130. Alternatively, or in addition, the file repository 108 may be stored at a separate computing system or repository that is included in the entity computing environment 110.

Computing systems of the entity computing environment 110 may communicate with the data center 106 and/or the sender computing system 102 (or other user computing systems) via the network 104. The network 104 may include any type of communication network. For example, the network 104 may be or may include a wired network, a wireless network, a wide area network (WAN), a local area network (LAN), a cellular network, or the like. Further, the network 104 may be or may include the Internet.

One or more systems of the file exchange system 140, the file exchange front end 120, and/or the file exchange backend 130 may be implemented by one or more hardware processors, which may execute computer-readable instructions in a memory or a non-transitory computer readable medium. Further, in some cases, one or more systems of the file exchange system 140, the file exchange front end 120, and/or the file exchange backend 130 may be implemented by computing resources, such as a memory and a processor, hosted by a data center 106.

In some embodiments, the entity computing environment 110 may include an internal network for enabling communication between systems of the entity computing environment 110. This internal network may be a wired or wireless network, or a combination thereof. Further, the internal network may be in communication with the network 104.

Each of the sender computing system 102, the recipient computing system 112, and the requester computing system 114 may include any type of computing system. For example, the computing system may be a desktop, a laptop, a smartphone, a tablet, a wearable computing device, a thin client, a server computing system, and the like.

Example File Request Process

Figure 2:
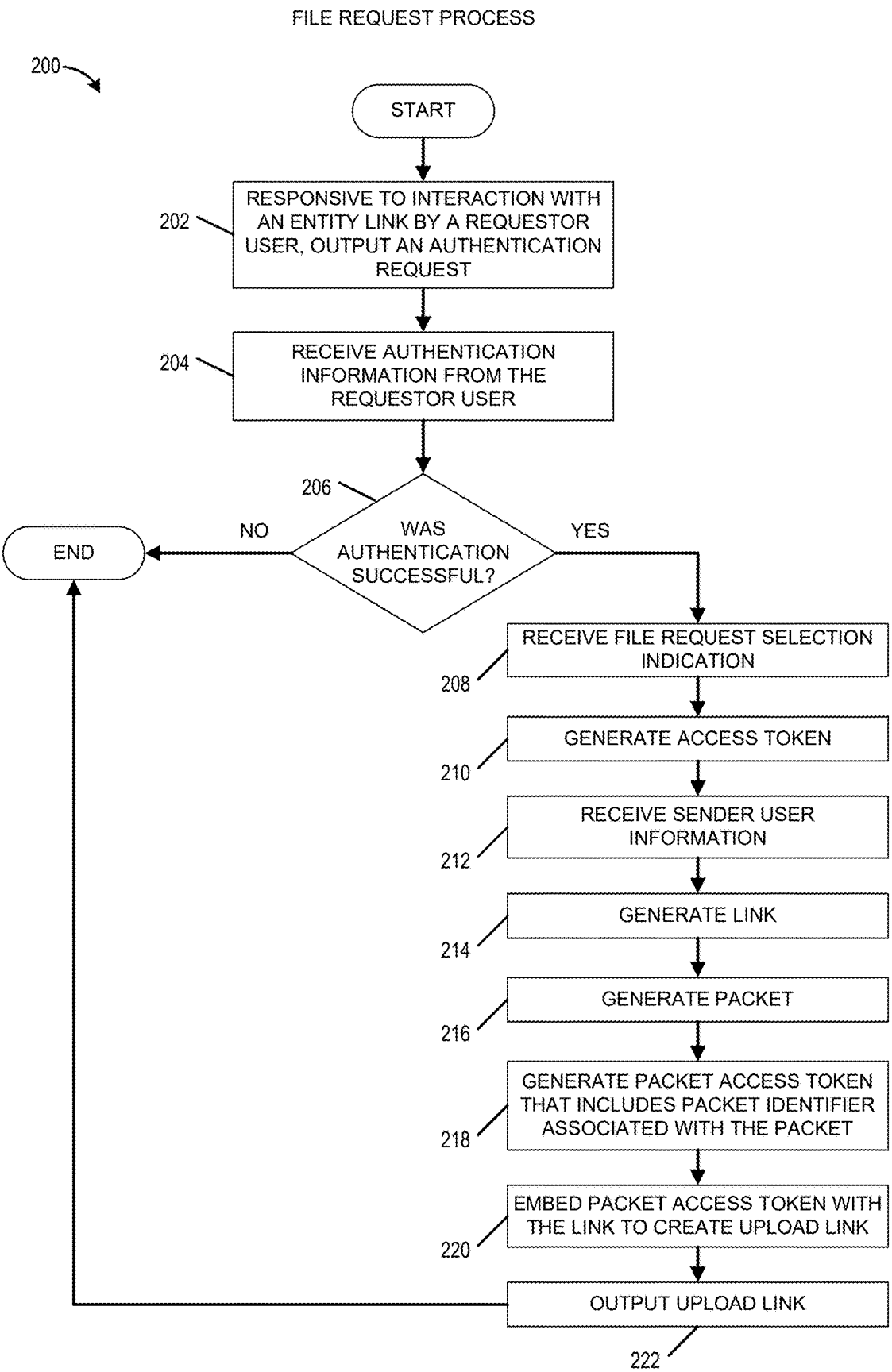
FIG. 2 presents a flowchart of an example file request process in accordance with certain embodiments.

FIG. 2 presents a flowchart of an example file request process 200 in accordance with certain embodiments. The process 200 can be implemented by any system that can generate an upload link on behalf of a requestor user and that may be provided to a sender user to send files to a recipient user. The process 200, in whole or in part, can be implemented by, for example, a file exchange system 140, a file exchange front end 120, a file exchange backend 130, a user interface 122, a link generator 124, a token access system 126, a secure packet generator 132, a token generator 134, a token verification system 136, and the like. Although any number of systems, in whole or in part, can implement the process 200, to simplify discussion the process 200 will be described with respect to particular systems.

The process 200 begins at block 202 where, for example, the file exchange front end 120, responsive to interaction with an entity link by a requestor user, outputs an authentication request. The requestor user may interact with the entity link via a requester computing system 114. Further, the entity link may be presented via a webpage, a dashboard of an application, or any other user interface that may be generated or presented by the user interface 122 or by the file exchange system 140. The entity link may be a unique link that is associated with an entity or organization associated with the entity computing environment 110. For example, the entity link may be associated with a car dealership, a car dealership network, a law firm, a government agency, a university, or any other type of entity or organization that may desire to facilitate secure file transfer. The entity link may be any type of digital link that can enable a user to initiate interaction with the file exchange system 140. For example, the entity link may be a Uniform Resource locator (URL), a Uniform Resource Identifier (URI), a Quick Response (QR) code, an application shortcut, a client application that interfaces with the file exchange system 140, and the like.

At block 204, the file exchange front end 120 receives authentication information from the requestor user. In some cases, the authentication information is received from the requester computing system 114 in response to the requester user interacting with the requester computing system 114. The authentication information may be any type of authentication information that can be used to authenticate the identity of a user. Alternatively, in some cases, the authentication information may be identification information, and may or may not be used to authenticate the identity of the user, but only to identify the user. The authentication information can include, for example, an email address, a password, multifactor authentication information, an employee identifier, a user name, and the like. While in some cases it may be desirable to authenticate the requestor user, it should be recognized that because the requestor user is requesting files, but may not have access to the requested files, it may not be necessary to authenticate the requestor user in many cases.

At decision block 206, the file exchange front end 120 determines whether authentication of the requestor user was successful. The decision block 206 may include attempting to authenticate the requestor user based at least in part on the authentication information received at the block 204. As described above, in some cases, authentication is unnecessary. In some such cases, the decision block 206 may be a user identification process to identify the requestor user, but may or may not authenticate the requestor user. In some such cases, identifying the requester user may include identifying an account of the requestor user. Further, identifying the requester user may be performed so as to identify a recipient that is to have access to the files uploaded by a sender user.

If the file exchange front end 120 determines at the decision block 206 that the authentication was unsuccessful, the process 200 ends. In some cases, there may be multiple attempts at authentication before the process 200 ends. Further, the process 200 may include outputting an indication of why authentication was not successful. Moreover, the process 200 may include one or more remediation steps to address unsuccessful authentication, such as contacting a supervisor or providing the opportunity to request a password change after alternative authentication procedures, etc.

If the file exchange front end 120 determines at the decision block 206 that the authentication was successful, the process 200 proceeds to block 208 where the file exchange front end 120 receives a file request selection indication. The file request selection indication may be received in response to the requestor user interacting with the user interface 122 via the requester computing system 114. In certain embodiments, the operations associated with the block 208 are optional or omitted. For example, a requestor user may automatically be associated with a file request option and not a file send option or other options and therefore, the file exchange front end 120 may determine that a file request option is desired based on identifying the requestor user as part of the authentication process.

At block 210, the token generator 134 generates an access token. The access token may be used to provide the file exchange front end 120 with access to the file exchange backend 130 for a particular period of time or for a communication session. In some cases, the access token may be associated with a time-to-live value. It should be understood that the access token generated at the block 210 is used to regulate or track communication between the file exchange front end 120 and the file exchange backend 130 and is not presented to a user. In some cases, the access token can serve as a type of session identifier that can be used to track communication between the file exchange front end 120 and the file exchange backend 130. In some cases, the access token is used to verify that the user that is making a request at the file exchange front end 120 is authenticated or still authenticated and it the same person that was authenticated at the block 204. Although the access token may function as a type of session identifier, in some cases, because the access token is used to confirm consistency in communication, the access token may not be stored anywhere but may be used as a signature for communications between the file exchange front end 120 and the file exchange backend 130. For example, the access token may be implemented as a JSON Web Token. In some cases, the operations of the block 210 are optional or omitted. Further, in some cases, the operations of the block 210 are performed as part of the block 204.

At block 212, the file exchange front end 120 receives sender user information. The sender user information may include any information that can be used to identify the sender user. Further, the sender user information may include information to be provided to the sender user along with a file request or upload link. In some cases, certain information may be required, and certain information may be optional or omitted. The sender user information may include, for example, a legal name, a username, an avatar name, a reference number, a message, a selection of requested information or files, an identifier, and the like. Further, the sender user information may include an identifier associated with the recipient, which may be included as part of a message provided to the sender user and/or may be used to configure the recipient that receives the files. In certain embodiments, the requesting user selects from registered recipients that are registered by an authorized administrator and cannot register a new recipient. Accordingly, the requesting user cannot cause the files to be provided to an unauthorized recipient.

At block 214, the link generator 124 generates a link. The link may enable a user who interacts with the link to access the file exchange system 140. More specifically, the link may enable a user to access a file at the file repository 108 that is accessible via the file exchange system 140.

At block 216, the secure packet generator 132 generates a packet. The packet may be a transaction identifier or any other type of identifier that can be associated with the link, the sender user, and/or an addressable location within the file repository 108. Generating the packet may involve generating a unique identifier that can be associated with data that is uploaded and that can be referenced in order to locate the uploaded data. The packet or an identifier associated with a packet may be stored in a data structure, such as a table. This data structure may be used to associate the sender user, uploaded files, and/or addressable locations of files or storage within the file repository 108. For example, an identifier of the sender user may be associated with an identifier of the packet within a table. This table or data structure may be stored within the packet tables repository 138. The packet tables repository 138 may be within the file exchange backend 130 and/or may itself be stored within the data center 106. Further, the file exchange backend 130 may update the table or data structure entity associated with the packet to associate the packet with a new storage location if files are moved with the file repository 108 or upon allocation of space due to the upload of files. In other words, in some cases, the storage location associated with the packet may by dynamic or not static.

In addition to associating the sender with the packet, the file exchange backend 130 may associate one or more recipients with the packet. The file exchange backend 130 may associate a recipient identifier for each of the one or more recipients with the packet in the table or data structure. The one or more recipients may be recipients that are associated with the requestor user or an identifier of the requestor user. Determining the one or more recipients may include accessing a relationship table, or other data structure, that relates identifiers of recipients with an identifier of the requestor user. This relationship table may be stored in the packet tables repository 138 or another repository within the file exchange system 140.

At block 218, the token generator 134 generates a packet access token that includes a packet identifier associated with the packet generated at the block 216. The packet access token may be associated with particular rights. For example, the packet access token may be an upload access token or a modify packet token that permits a user to upload files to a storage location associated with the packet. As another example, the packet access token may be a view access token that permits a user to view files associated with a packet. Viewing files may include viewing file content on a user interface, downloading file content, printing file content, and/or any other type of file access permission that enables a user to access the content of a file. In some cases, the file access token may permit viewing the file, but not downloading the file. In some cases, the packet access token may permit deleting files. Moreover, in certain embodiments, the file exchange system 140 may automatically delete files after they have been accessed or viewed.

In some embodiments, the packet access token may include an identification number and/or a key to a packet table. In some such cases, the packet access token itself may not identify specific access rights or restrictions, but such rights or restrictions may be determined by accessing an entry in the packet table associated with the packet access token. The entry in the table may be determined based on the identification number or the key. Further, the packet access token may include the packet identification number that identifies the packet. Upon receiving a token, the file exchange system 140 can access the packet table using the identification number to determine the rights associated with the token. Moreover, the token generator 134 may specify the rights associated with the packet access token in the table or data structure entry associated with the packet or packet access token when generating the packet access token.

At block 220, the link generator 124 embeds the packet access token with the link to create an upload link. Embedding the packet access token may including appending the packet access token to the link. In some embodiments, the packet access token is not embedded with the link. Instead, a reference to a packet access token may be embedded or included with the link. In some such cases, the token access system 126 can access the packet access token by using the reference to the token to access the packet access token or to determine the packet access token to access.

At block 222, the file exchange front end 120 outputs the upload link. Outputting the upload link may include updating the output link on a user interface 122. In some cases, the upload link is output to the requester computing system 114 enabling the requester computing system 114 to display the upload link to the requester. The requester can then send the upload link to the sender using any means at the requester's disposal (e.g., email, text, chat, direct message, etc.). Advantageously, because the packet access token and/or the packet are associated with the sender user, another user who obtains access to the upload link will be unable to use the link without knowing the sender user's identifier. Moreover, even if another user could utilize the upload link, the upload link may permit files to be uploaded without any other access permissions. Accordingly, a malicious user could not obtain access to files. Further, in some cases the upload link is useable only once to upload files. Thus, once the sender user has uploaded files, the link may no longer be useable.

In some cases, the upload link may be provided directly to the sender user via the file exchange system 140. In such cases, the upload link may be emailed, texted, received via a push notification, or otherwise provided to the sender user via, for example, the sender computing system 102. Further, provided the upload link to the sender user may include providing a message included by the requester user. In some cases, the upload link may be provided with instructions to the sender user on how to user the upload link or to interact with the file exchange system 140 to upload files for access by a recipient user.

In some embodiments, upon the sender user sending or uploading files using the upload link, a recipient associated with the requester may be notified that the file or information request has been fulfilled. In some such cases, a link may be provided to the recipient user. This link may be associated with the packer and may enable authorized recipients to access the packer. Typically, only authorized recipients will receive the link. And authenticated authorized recipients may access the files associated with the packet that were uploaded by the sender user.

Thus, in one nonlimiting example use case, an employee (e.g., an assistant or a salesman, etc.) of a dealership may use the process 200 to request certain desired files or information (e.g., financial information or proof of savings, etc.) from a potential customer (e.g., someone who desires to purchase a car) of the dealership. Once the potential customer has provided the information via the upload link, a separate employee (e.g., someone in the finance department) or an employee of another entity (e.g., an employee of a bank processing a car loan) may receive the information by accessing a download link. In this example, the employee who requested the information may not be able to access the information. Thus, security or privacy of the information may be greater than other systems that permit the requester of information to also view the information.

It should be understood that the operations associated with the process 200 may be performed at least partially in parallel or in a different order. For example, the operations associated with the block 210 may be performed before the operations associated with the block 208 or as part of the operations included with the block 204.

Example File Upload Process

Figure 3:
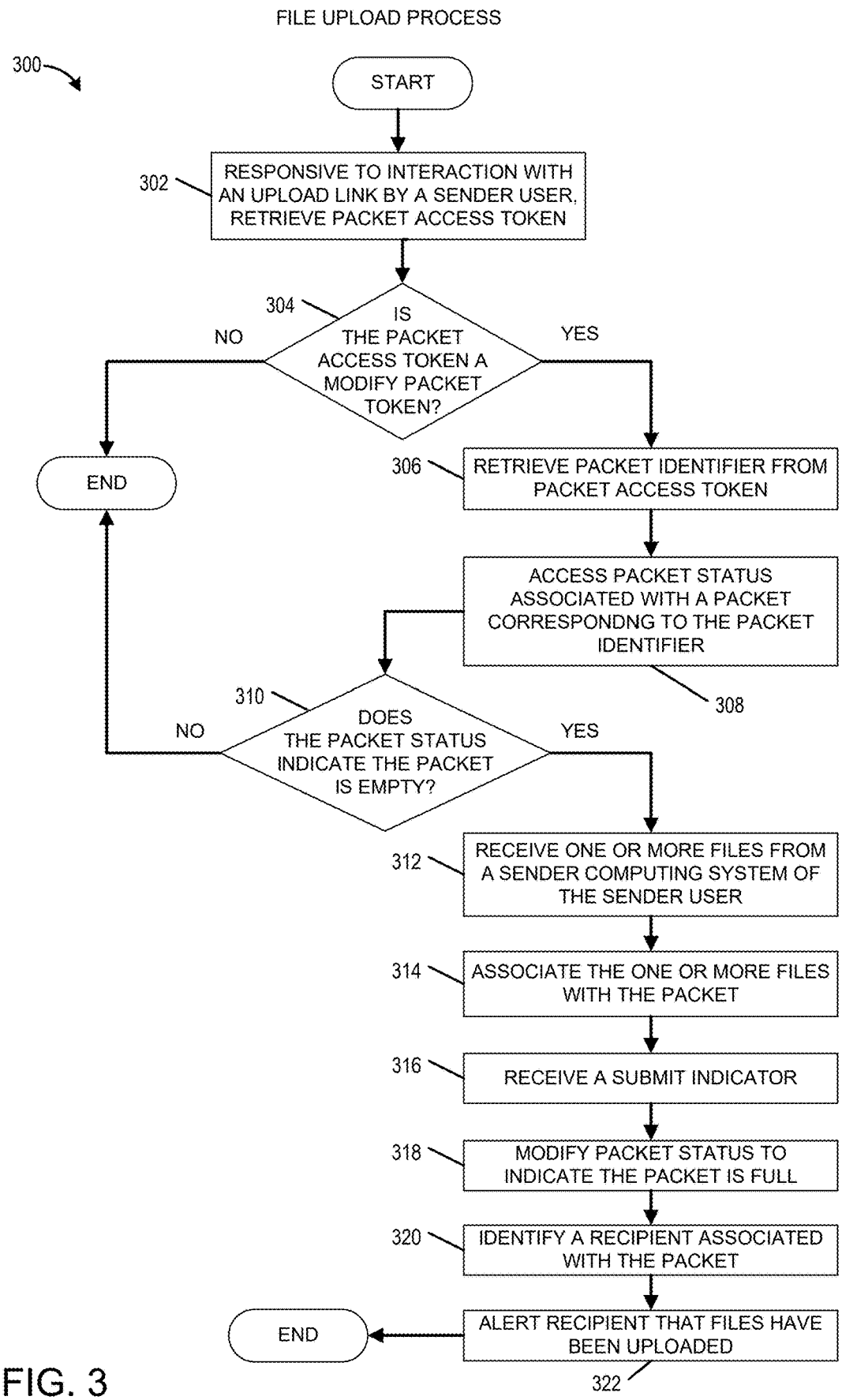
FIG. 3 presents a flowchart of an example file upload process in accordance with certain embodiments.

FIG. 3 presents a flowchart of an example file upload process 300 in accordance with certain embodiments. The process 300 can be implemented by any system that can perform a file upload process or that can enable a sender user to send a file to a recipient using a link generated by a requester user or by the recipient user. The process 300, in whole or in part, can be implemented by, for example, a file exchange system 140, a file exchange front end 120, a file exchange backend 130, a user interface 122, a link generator 124, a token access system 126, a secure packet generator 132, a token generator 134, a token verification system 136, and the like. Although any number of systems, in whole or in part, can implement the process 300, to simplify discussion the process 300 will be described with respect to particular systems.

The process 300 begins at block 302 where, for example, the token access system 126, responsive to interaction with an upload link by a sender user, retrieves a packet access token. The sender user may interact with the upload link via a sender computing system 102. Further, like the entity link, the upload link may be presented via a webpage, a dashboard of an application, or any other user interface that may be generated or presented by the user interface 122 or by the file exchange system 140. Moreover, the upload link may be presented via a browser, an application, or any other method that can present a link to a user.

Retrieving the packet access token may include determining a portion of the upload link that includes the token and retrieving the token from the link itself. Alternatively, the packet access token may be obtained by accessing an address referenced by the upload link to obtain the token. In some cases, a hash or decryption process is performed to obtain the packet access token from data included in the upload link or referenced by the upload link.

At decision block 304, the token verification system 136 determines whether the packet access token is a modify patent token. Determining whether the packet access token is a modify patent token may include determining a value including in the packet access token, determining whether a value is present or absent, accessing a table associated with the packet access token to determine rights associated with the token, accessing metadata associated with the packet access token, or any other method for determining a type of the packet access token or rights granted by the packet access token. If it is determined at the decision block 304 that the packet access token is not a modify patent token, the process 300 ends. In some cases, the process 300 may include determining if the packet access token is another type of token and performing one or more operation associated with the token. For example, if it is determined that the packet access token is a view access token, the process 300 may include performing one or more operations associated with a file access process, such as the process 600 described in more detail below.

If it is determined at the decision block 304 that the packet access token is a modify patent token, the process 300 proceeds to block 306 where the token access system 126 retrieves a packet identifier from the packet access token. Retrieving the packet identifier from the packet access token may include accessing a portion of the packet access token that consists of or includes the packet identifier. Alternatively, the packet identifier may be obtained by accessing a table or data structure referenced by the packet access token.

At block 308, the file exchange backend 130 accesses a packet status associated with a packet corresponding to the packet identifier. The packet may be a container, a storage location, or any way of grouping one or more files together and that can be associated with the packet identifier. In some cases, the packer may be an entry in a table or data structure that can be associated with a user, a file, or a storage location.

Accessing the packet status may include accessing a table or other data structure stored, for example, at the packet tables repository 138 and that includes a status of one or more packets. The packet status may be obtained by using the packet identifier to index the table or to access a particular entry in the table associated with the packet. The packet status may indicate whether the packet is empty. If the packet is empty, there are no files associated with the packet. In other words, no files have been uploaded or stored at a location within the file repository 108 that is associated with the packet.

In some cases, determining the packet status may include accessing a storage location at the file repository 108 associated with the packet. If it is determined that there are no files stored at the storage location, the packet status may be determined to be empty.

At decision block 310, the file exchange backend 130 determines whether the packet status indicated that the packet is empty. If it is determined at the decision block 310 that the packet is not empty, the process 300 ends and the sender user is denied access to the packet. In certain embodiments, an upload is only performable once per upload link and/or per packet. Accordingly, if it is determined that the packet status is not empty, the upload link is no longer useable to upload files to the packet or to a storage location associated with the packet.

If it is determined at the decision block 310 that is packet is empty, the process 300 proceeds to the block 312 where the file exchange front end 120 receives one or more files from a sender computing system 102 of the sender user. The files received from the sender computing system 102 may be stored at the file repository 108, which may be at the data center 106 or at the entity computing environment 110. In some cases, the one or more files may be stored contiguously at a particular address. In other cases, the one or more files may be distributed throughout one or more storage locations of the data center 106. In some cases, the files may be stored indefinitely at the file repository 108 or until such time as the files are deleted or accessed. However, generally the file exchange system 140 is configured for exchanging files and not necessarily for long term storage. Accordingly, in some cases, the file repository 108 may store the files for a limited time duration, such as for a fixed period of time, until a packet expires, or until the files are accessed. Once the time duration has expired or the files are accessed, further access to the files may be prevented and/or the files may be deleted.

In some embodiments, the file exchange system 140 may analyze the received files. For example, the file exchange system 140 may perform a virus scan on the received files, determine whether the files are corrupted, determine whether the files are incomplete, or perform any other type of analysis that can be performed on files received as part of an upload or file transfer process. In some embodiments, the files are encrypted. In some such cases, the file exchange system 140 may be capable of decrypting the files, performing one or more file analyses processes (e.g., a virus scan), and then the files may be encrypted again. In other embodiments, the files are encrypted using an end-to-end encryption scheme. In such cases, the file exchange system 140 may be unable to decrypt the files and the files may not be analyzed. In some cases, the files may be analyzed (e.g., scanned for viruses) at a time when a recipient user attempts to access the files.

At block 314, the file exchange backend 130 associates the one or more files with the packet. Associating the one or more files with the packet may include storing in a data structure or table entry associated with the packet one or more addresses where the files are stored at the file repository 108. This table may be stored at the packet tables repository 138. The data structure or table entry may be accessed using the packet identifier of the packet. Alternatively, or in addition, associating the files with the packet may include storing a link to the files in the table entry associated with the packet.

At block 316, the file exchange front end 120 receives a submit indicator. The submit indicator may indicate that the sender user has finished providing files as part of the upload process. In some cases, the submit indicator may be received in response to a user (e.g., the sender user) interacting with an interface element that indicates that the user has finished uploading or selecting files to upload. This interface element may be on a user interface used to upload or indicate files to upload. In some cases, the submit indicator may automatically be received along with receipt of the files. In some cases, the files are not received by the file exchange system 140 until such time that the user interacts with the interface element indicating that the user has finished uploading or selecting files to upload.

In some cases, upon receipt of the submit indicator, the packet access token may be marked as used or invalid in the packet table. Thus, the packet access token and/or the upload link cannot be used more than once to upload files. Advantageously, by rendering the packet access token and/or upload link unusable after one user, a user or other user cannot later send files to the recipient for malicious purposes (e.g., files that include a virus).

At block 318, the file exchange backend 130 modifies the packet status to indicate that the packet is full or nonempty. It should be understood that, in some cases, there is not a storage cap associated with the packet and that modifying the packet status to be full may be to prevent subsequent file uploads and not to indicate a lack of storage space. By indicating that the packet is full or nonempty, a subsequent attempt to access the packet to upload files using the process 300 would indicate at the decision block 310 that the packet status it not empty and the process 300 would end preventing additional file uploads. Thus, it is possible to permit one file upload session per packet.

In some cases, the packet status is modified after the submit indicator. Thus, if a user does not select the user interface element associated with the submit indicator, the user may be able to upload files again enabling the user to finish an upload process in a later session. Further, in some cases, files are not uploaded until the submit user interface element is selected. Thus, in some cases, files may not be transferred until such time that the sender user is satisfied that they have selected all the files they desire to upload or transmit to the recipient user. The packet status may be modified by accessing a corresponding entry in a table of the packet tables repository 138 and modifying the packet status value.

At block 320, the file exchange backend 130 identifies a recipient associated with the packet. Identifying the recipient (or recipients) may include accessing a table or table entry from the packet tables repository 138 that corresponds to the packet.

At block 322, the file exchange front end 120 alerts the recipient that files have been uploaded. The alert may be provided using any type of communication method. For example, the recipient may receive an email, a text, a chat message, a direct message, or the like. In some cases, the recipient may receive a link with a packet access token enabling the recipient to view the files. This link may be generated using one or more of the processes described with respect to the process 400 described in more detail below. Further, the files may be access using a file access process such as the one described below with respect to the process 600 of FIG. 6.

Example Permalink File Upload Process

Figure 4:
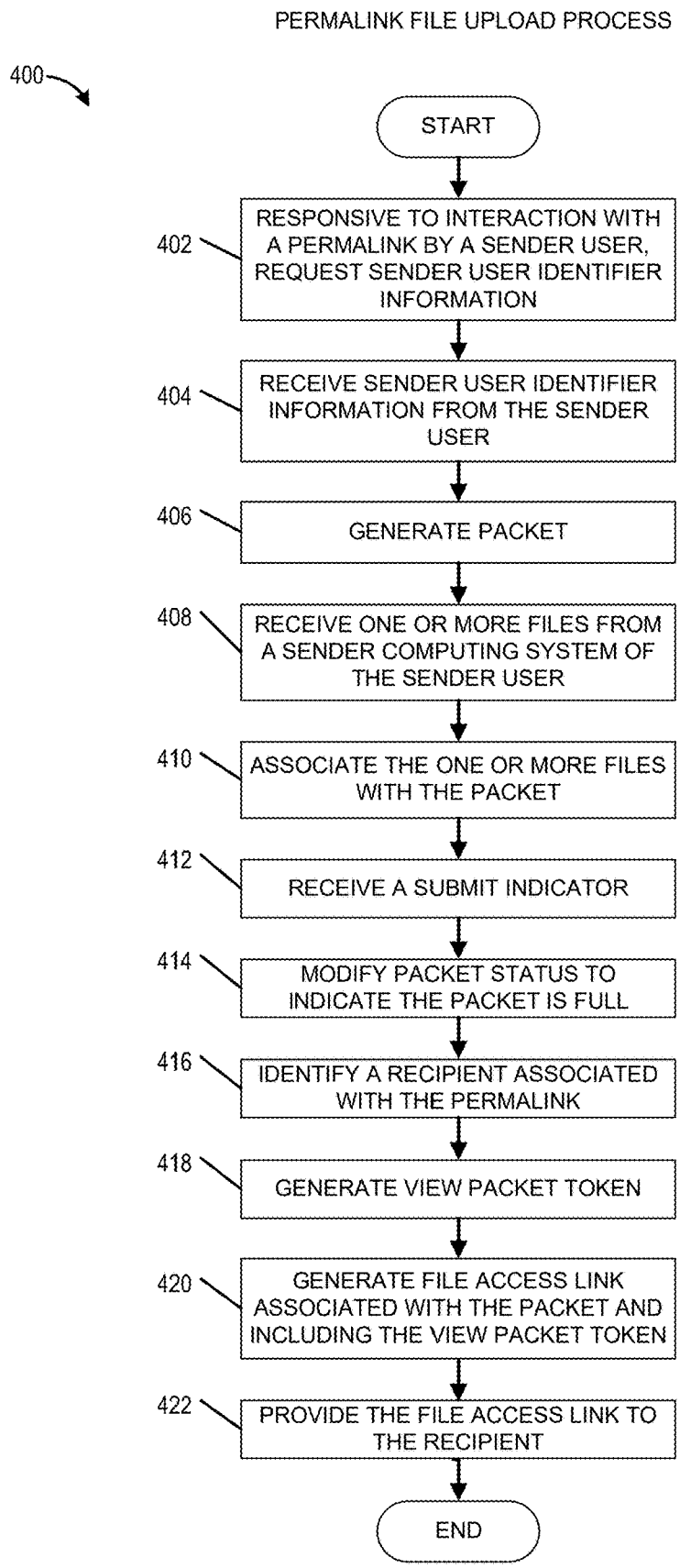
FIG. 4 presents a flowchart of an example permalink file upload process in accordance with certain embodiments.

FIG. 4 presents a flowchart of an example permalink file upload process 400 in accordance with certain embodiments. The process 400 can be implemented by any system that can perform a file upload process or that can enable a sender user to send a file to a recipient using an accessible link that is not specifically generated for a particular sender or for a particular upload request. The sender user may be external to an entity associated with the entity computing environment 110. Further, the recipient may or may not be a particular recipient or specified by the sender user. The process 400, in whole or in part, can be implemented by, for example, a file exchange system 140, a file exchange front end 120, a file exchange backend 130, a user interface 122, a link generator 124, a token access system 126, a secure packet generator 132, a token generator 134, a token verification system 136, and the like. Although any number of systems, in whole or in part, can implement the process 400, to simplify discussion the process 400 will be described with respect to particular systems.

The process 400 begins at block 402 where, for example, the file exchange front end 120, responsive to interaction with a permalink by a sender user, requests sender user identifier information associated with the sender user. The permalink may be a link that is accessible by one or more users to upload files to an entity or another user. In contrast to the upload link, the permalink may generally be accessible by at least a certain set of users for at least a certain period of time and is not specific to a particular user or packet. In other words, while an upload link may be generated for uploading files to a particular packet or for a particular sender, the permalink may not be tied to or associated with a specific packet or sender. The permalink may be accessed via a web browser, an application, or other user interface. For example, the sender user may visit a webpage associated with an entity to view and access the permalink.

Requesting sender user information may include presenting a webpage or an application page that includes one or more user interface elements that request the sender user identifier information. For example, the webpage may include a drop down list, a textbox, one or more text fields, one or more checkboxes, etc. In some cases, requesting the sender user information may include presenting one or more prompts that request particular types of information.

At block 404, the file exchange front end 120 receives sender user identifier information from the sender user. In some cases, the sender user identifier information is received from the sender computing system 102 in response to the sender user interacting with the sender computing system 102. This sender user information may include any of the information described with respect to the block 212. For example, the sender user information may include a name, an email address, a physical or mailing address, a reference number, a message to provide to a recipient, and the like. In some cases, at least some of the sender user information may be required. Further, in some cases, at least some of the sender user information may be optional.

At block 406, the secure packet generator 132 generates a packet. In certain embodiments, the block 406 may include one or more of the embodiments associated with the block 216.

At block 408, the file exchange front end 120 receives one or more files from a sender computing system 102 of the sender user. In certain embodiments, the block 408 may include one or more of the embodiments associated with the block 312.

At block 410, the file exchange backend 130 associates the one or more files with the packet. In certain embodiments, the block 410 may include one or more of the embodiments associated with the block 314.

At block 412, the file exchange front end 120 receives a submit indicator. In certain embodiments, the block 412 may include one or more of the embodiments associated with the block 316.

At block 414, the file exchange backend 130 modifies the packet status to indicate that the packet is full. In certain embodiments, the block 414 may include one or more of the embodiments associated with the block 318.

At block 416, the file exchange backend 130 identifies a recipient, or in some cases recipients, associated with the permalink. The recipient or recipients may be identified by accessing a table, such as a table at the packet tables repository 138, that associates one or more recipients with the permalink. In some cases, the sender user may select a recipient. The recipient may be selected from a set of recipients that are identified to the sender user by the file exchange system 140. These recipients may each be registered and/or approved recipients.

At block 418, the token generator 134 generates a view packet token. In certain embodiments, the block 418 may include one or more of the embodiments associated with the block 218. The view packet token may include a token that grants access to files that have been uploaded by the sender user. This access may include one or more of viewing the files, downloading the files, printing the files, or any other type of access that enables the recipient to access the files from the file repository 108 or location where the files are stored.

At block 420, the link generator 124 generates a file access link associated with the packet. Further, the file access link may include the view packet token. In certain embodiments, the block 420 may include one or more of the embodiments associated with the block 214 or the block 220.

At block 422, the file exchange front end 120 provides the file access link to the recipient. Alternatively, the files access link is output to the sender user who may provide the file access link to the recipient. In certain embodiments, the block 422 may include one or more of the embodiments associated with the block 222.

In certain embodiments, the permalink may be associated with a requester. The requester may be an employee of the entity associated with the entity computing environment 110. The recipient may also be an employee of the entity associated with the entity computing environment 110. Further, the requester and recipient may be different users. Advantageously, having a separate requester and recipient enables an administrator, which could also include one or the requester or recipient, to change one of the requester and/or recipient associated with the permalink without changing the other of the requester and/or recipient. Further, the users associated with the permalink can be changed without modifying the link itself by modifying users associated with the link in a table or other data structure maintained in the packet tables repository 138, or other repository that maintains metadata for the permalink. Nevertheless, in certain embodiments, the recipient user and the requester user can be the same user because, for example, the permalink may be maintained for multiple use rather than being generated in real time or in response to a file transfer request.

Example File Sending Process

Figure 5:
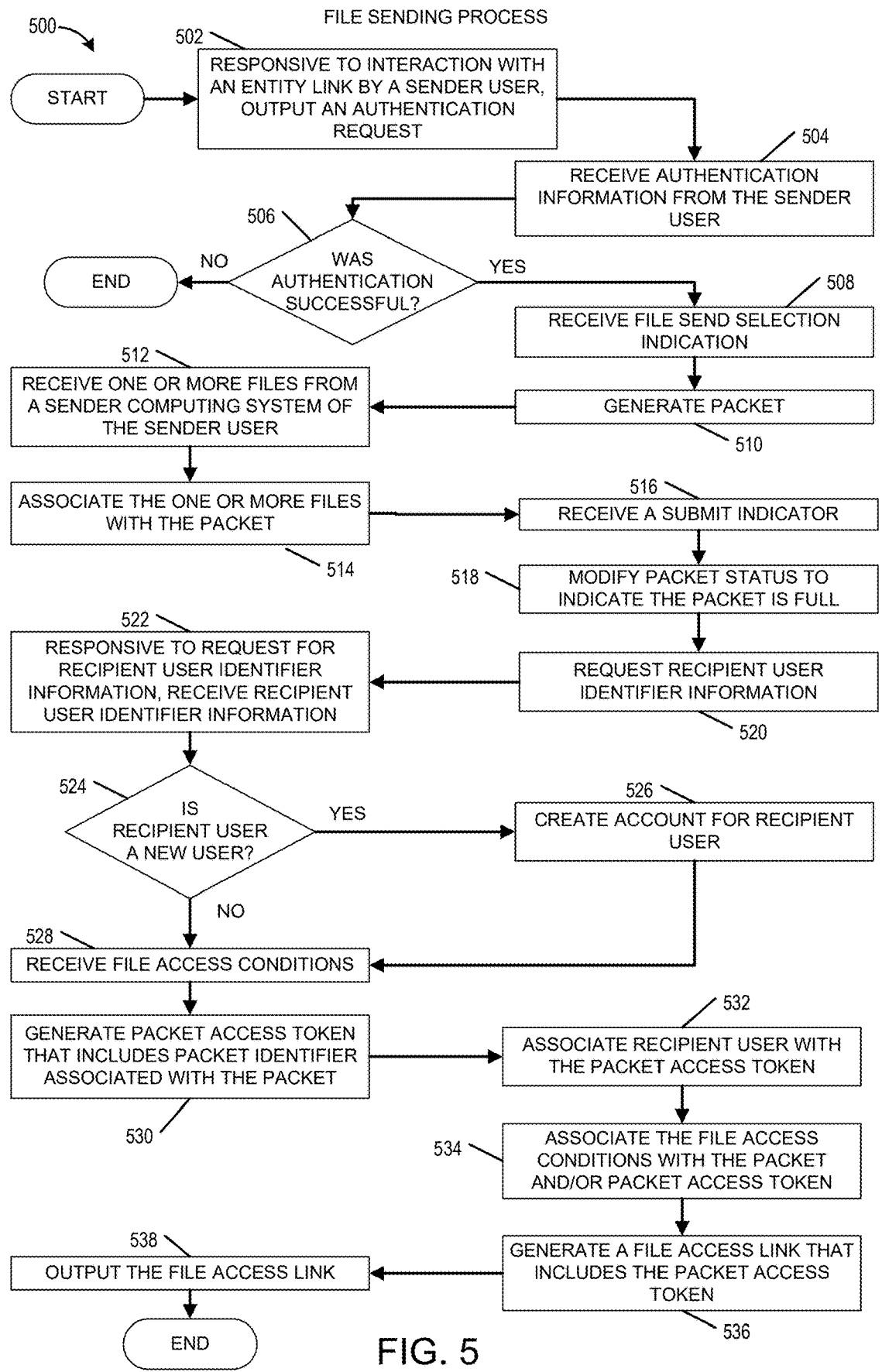
FIG. 5 presents a flowchart of an example file sending process in accordance with certain embodiments.

FIG. 5 presents a flowchart of an example file sending process 500 in accordance with certain embodiments. The process 500 can be implemented by any system that can perform a file sending process or that can enable a sender user to send a file to a recipient. Further, the process 500 may enable a sender user who is associated with an entity that is associated with the file exchange system 140 to send files to a recipient who may or may not be associated with the entity or the file exchange system 140. In other words, the process 500 may be used to send files to a user that is external to the entity associated with the entity computing environment 110.

The process 500, in whole or in part, can be implemented by, for example, a file exchange system 140, a file exchange front end 120, a file exchange backend 130, a user interface 122, a link generator 124, a token access system 126, a secure packet generator 132, a token generator 134, a token verification system 136, and the like. Although any number of systems, in whole or in part, can implement the process 500, to simplify discussion the process 500 will be described with respect to particular systems.

The process 500 begins at block 502 where, for example, the file exchange front end 120, responsive to an interaction with an entity link by a sender user, outputs an authentication request. In certain embodiments, the block 502 may include one or more of the embodiments associated with the block 202. The authentication request may be on any type of user interface. For example, the authentication request may be presented as a webpage or other UI screen of an application and that includes one or more user interface elements requesting authentication information. In some cases, the authentication request is output in response to a user interacting with a unique link associated with a requesting organization of entity (e.g., a car dealership, a law firm, a government agency, etc.). In some cases, the entity link may be a hyperlink or other type of clickable or selectable link. Alternatively, or in addition, the entity link may be represented by a QR code or other machine-readable code.

The sender user may be associated with the entity (e.g., an employee or partner). Accordingly, in some cases, the authentication information may identify the sender user (e.g., an employee) or sender user account (e.g., an employee account) that is registered with the file exchange system 140. Alternatively, or in addition, the sender user may be a customer of the entity. In some cases, the sender user may or may not be registered with the file exchange system 140. In some such cases, the sender user may be requested to register with the file exchange system 140 to complete the process 500. The sender user may interact with the file exchange system 140 via the sender computing system 102. In cases where the sender user is associated with the entity, the sender computing system 102 may be included as part of the entity computing environment 110.

At block 504, the file exchange front end 120 receives authentication information from the sender user. The authentication information can include any type of information that may be used to identify a sender user or to authenticate the sender user. In certain embodiments, the block 504 may include one or more of the embodiments associated with the block 204. For example, the authentication information may include an email, a username, a password, a multifactor authentication (MFA) input (e.g., an MFA pin or passcode), and the like.

At decision block 506, the file exchange front end 120 determines whether the authentication was successful. In some cases, the authentication may include identifying a user with or without authenticating the user. Thus, in some cases, the authentication information may be referred to as identification information. For example, if the user is an employee, authentication may not be necessary. In other cases, authentication occurs regardless of whether the user is an employee. If it is determined at the decision block 506 that the authentication was not successful, the process 500 ends.

If it determined at the decision block 506 that the authentication was successful, the process 500 proceeds to the block 508 where the file exchange front end 120 receives a file send selection indication. The file send selection indication may be used to indicate to the file exchange system 140 that the sender user desired to send files to a recipient user as opposed, for example, to creating a file request link or upload link. In some cases, the file exchange system 140 may automatically determine that the sender user desires to send files based, for example, on the entity link itself or the identity of the sender user as determined based on the authentication (or identification) information. Accordingly, in some cases, the block 508 may be optional or omitted.

At block 510, the secure packet generator 132 generates a packet. In certain embodiments, the block 510 may include one or more of the embodiments associated with the block 216 or the block 406.

At block 512, the file exchange front end 120 receives one or more files from a sender computing system 102 of the sender user. In certain embodiments, the block 512 may include one or more of the embodiments associated with the block 312 or the block 408.

At block 514, the file exchange backend 130 associates the one or more files with the packet. In certain embodiments, the block 514 may include one or more of the embodiments associated with the block 314 or the block 410.

At block 516, the file exchange front end 120 receives a submit indicator. In certain embodiments, the block 516 may include one or more of the embodiments associated with the block 316 or the block 412.

At block 518, the file exchange backend 130 modifies the packet status to indicate that the packet is full. In certain embodiments, the block 518 may include one or more of the embodiments associated with the block 318 or the block 414.

At block 520, the file exchange front end 120 requests recipient user identifier information. As with the request for authentication information, the request for recipient user identifier information may be fields on a webpage or other application page, may be queries to the sender user, or may be any other type of digital request. Further, the request may include an identity of required information and/or optional information.

At block 522, responsive to the request for the recipient user identifier information, the file exchange front end 120 receives the recipient user identifier information. The recipient user identifier information may include any type of information that may be used to identify a user to associate with the packet and/or to send an indication that files have been uploaded for access by the recipient user. Further, the recipient user may be an internal user (e.g., an employee or other user associated with the entity) or an external user (e.g., a customer, a government employee or representative, or any other user not affiliated with the entity that may be capable of receiving files using the file exchange system 140). In cases where the recipient user is an external user, the recipient computing system 112 may not be included as part of the entity computing environment 110. Thus, in some cases, the sender computing system 102 may be associated with the entity computing environment 110 and the recipient computing system 112 may be separate from the entity computing environment 110. Alternatively, both the sender computing system 102 and the recipient computing system 112 may be associated with the entity computing environment 110, such as when an internal sender is sending files to an internal recipient.

The recipient user identifier information may include a name, an email, a username, an address, a reference number, a message, and the like. In some cases, some of the recipient user identifier information may be required (e.g., a name, username) and some may be optional (e.g., the message or reference number). In some cases, the recipient user may be identified by selecting from a list of eligible recipient users to receive the files.

At decision block 524, the file exchange backend 130 determines whether the recipient user is a new user of the file exchange system 140. The file exchange backend 130 may determine whether the recipient is a new user of the file exchange system 140 be accessing a table at the packet tables repository 138 or other user repository (not shown).

If it is determined at the decision block 524 that the recipient user is a new user, the process 500 proceeds to the block 526 where the file exchange backend 130 creates an account for the recipient user. Creating an account for the recipient user may include creating an account name. Further, creating the account may include creating a password (e.g., a temporary password). The account may be associated with the packet at the packet tables repository 138. In some cases, the entity link may be associated with the recipient. In some such cases, the operations associated with the block 520, block 522, decision block 524, and block 526 may be optional or omitted.

After the block 526 or if it is determined at the decision block 524 that the recipient user is not a new user, the process 500 proceeds to the block 528. At the block 528 the file exchange backend 130 receives file access conditions. The file access conditions may include any type of limit on accessing the uploaded files. For example, the file access conditions may limit the type of access (e.g., full access, view only access, download access, etc.). Further, the file access conditions may include associating a time limit on how long the files are available for access. This time limit may be associated with a total time of access and may permit multiple file accesses within the time limit. Alternatively, the time limit may be associated with a single access and after the files are accessed a first time, access may no longer be available regardless of whether the time limit has been reached. Thus, the uploaded files may be associated with a limited access duration that limits the amount of time or the number of accesses of the files. In some cases, the file access conditions may indicate authentication conditions, such as whether MFA is required to access the files.

At block 530, the token generator 134 generates a packet access token that includes a packet identifier associated with the packet generated at the block 510. This packet access token may be a view access token or any type of token that enables a recipient user to access the files received at the block 512 and associated with the packet. In certain embodiments, the block 530 may include one or more of the embodiments associated with the block 218.

At block 532, the file exchange backend 130 associates the recipient user with the packet access token. Associating the recipient user with the packet access token may involve associating an account, an account identifier, a recipient user identifier, or any other reference to the recipient user with the packet access token at the packet tables repository 138.

At block 534, the file exchange backend 130 associates the file access conditions with the packet and/or the packet access token. These file access conditions may also be referred to as packet access conditions. As indicated at the block 528, the file or packet access conditions may set access time limits. In some cases, the file access conditions may also set a limit on the number of accesses of the packet or file. In some cases, the packet may lock or be deleted after one (or some limited number of) accesses. Deleting the packet may include deleting files associated with the packet.

At block 536, the link generator 124 generates a file access link that includes the packet access token. The file access link may embed the packet access token, include a reference that identifies the packet access token at a table or in a data structure, include an encrypted version of the packet access token, and the like. In certain embodiments, the block 536 may include one or more of the embodiments associated with the block 214, the block 220, or the block 420.

At block 538, the file exchange front end 120 outputs the file access link. The access link may be outputted directly to the recipient user, or it may be outputted to the sender user enabling the sender user to provide it to the recipient user. In certain embodiments, the block 538 may include one or more of the embodiments associated with the block 222, the block 322, or the block 422.

Example File Access Process

Figure 6:
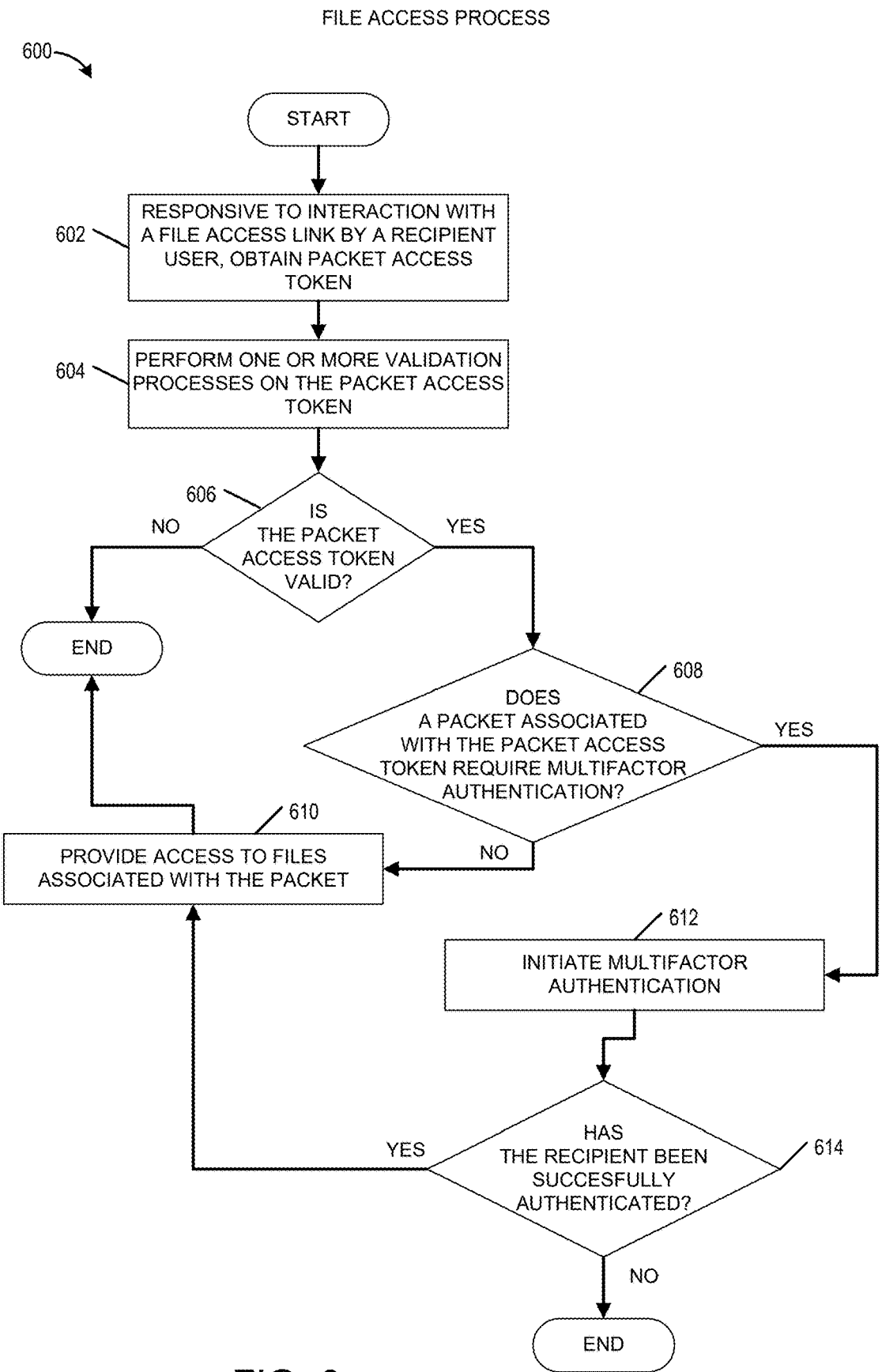
FIG. 6 presents a flowchart of an example file access process in accordance with certain embodiments.

FIG. 6 presents a flowchart of an example file access process 600 in accordance with certain embodiments. The process 600 can be implemented by any system that can perform a file access process to enable a recipient user to access files uploaded or sent by a sender user. Accessing files may include viewing, printing, downloading, or any other type of file access. The process 600, in whole or in part, can be implemented by, for example, a file exchange system 140, a file exchange front end 120, a file exchange backend 130, a user interface 122, a link generator 124, a token access system 126, a secure packet generator 132, a token generator 134, a token verification system 136, and the like. Although any number of systems, in whole or in part, can implement the process 600, to simplify discussion the process 600 will be described with respect to particular systems.

The process 600 begins at the block 602 where, for example, the token access system 126, responsive to interaction with a file access link by a recipient user, obtains a packet access token. The recipient user may interact with the file access link using a recipient computing system 112. Further, the recipient user may interact with the file access link via a webpage, via an application screen, via a machine-readable code (e.g., a QR code), or any other digital method that may present the file access link to the recipient user. Further, the token access system 126 may access the packet access token by extracting it from the file access link, by accessing a packet tables repository 138 to determine an associated token, by receiving it via a user interface element, or by any other method of obtaining a token in response to interaction with the file access link. Further, accessing the packet access token may include sending the packet access token to the file exchange backend 130. In certain embodiments, the block 602 may include one or more of the embodiments associated with the block 302.

At block 604, the token verification system 136 performs one or more validation processes or checks on the packet access token. The one or more validation processes can include any type of process for validating the packet access token, the access rights granted by the packet access token, and/or the recipient user. For example, the one or more validation processes may include determining whether a time-to-live value associated with the packet access token has expired, whether the recipient user is associated with the packet access token and/or the packet associated with the packet access token, determining whether the packet exists and/or whether files associated with the packet exist, whether an Internet Protocol (IP) address, or other type of network address, of the recipient computing system 112 is on a whitelist (or permitted list) or a blacklist (not permitted list), whether a Media Access Control (MAC) address of the recipient computing system 112 is on a whitelist (or permitted list) or a blacklist (not permitted list), and the like.

At decision block 606, the token verification system 136 determines if the packet access token is valid. Determining whether the packet access token is valid can include determining whether the one or more validation checks performed at the block 604 were successful. If it is determined at the decision block 606 that the packet access token is not valid, the process 600 ends. In some cases, the process 600 may include alerting a user (e.g., an administrator) of an unsuccessful attempt to access the packet or files associated with the packet. Alternatively, or in addition, the process 600 may include informing the recipient user of a reason for the unsuccessful attempt to access the packet or files associated with the packet. In other cases, no reason may be provided to the recipient user.

If it is determined at the decision block 606 that the packet access token is valid, the process 600 proceeds to the decision block 608 where the file exchange backend 130 determines whether a packet associated with the packet access token requires multifactor authentication (MFA). Determining whether the packet access token requires MFA may include accessing a table, or other data structure, from the packet tables repository 138 to determine whether the packet access token is associated with MFA. In some cases, MFA may be required for all packet access. In such cases, the operations associated with the decision block 608 may be optional or omitted.

If it is determined at the decision block 608 that the packet does not require multifactor authentication, the process 600 proceeds to the block 610 where the file exchange backend 130 provides access to file associated with the packet. Providing access to the file (or files) associated with the packet may include permitting the recipient user, using the recipient computing system 112, to view, print, download, or otherwise access the file (or files).

If it is determined at the decision block 608 that the packet does require multifactor authentication, the process 600 proceeds to the block 612 where the file exchange backend 130 initiates a multifactor authentication process. The multifactor authentication process can include any type of MFA process. For example, the MFA process may include requesting (and receiving) a pin or passcode using a pin or passcode generating app on a wireless device or from an MFA pin or passcode generating device. As another example, the MFA process may include directing the recipient user to provide a pin emailed to a registered email or texted to a registered phone number of the recipient user. As yet another example, the MFA process may include performing a biometric identification process, such as fingerprint scan, a retina scan, a voice recognition process, a facial recognition process, etc. In general, the MFA process may be based on a particular knowledge item of the recipient user (e.g., a password), a particular item in possession of the recipient user (e.g., a smartphone or passcode generator), or something unique about the recipient user (e.g., a fingerprint).

In some embodiments, the block 612 may include setting up MFA for the recipient user. For example, if the recipient user is new, the block 612 may include registering the recipient user with the file exchange system 140 and configuring the account of the recipient user for MFA. In some cases, the recipient user may be registered with the file exchange system 140 by another user (e.g., an administrator). In some such cases, upon first access (or first attempt to access files) by the recipient user, the block 612 may including configuring the account of the recipient user for MFA. Configuring the account of the recipient user for MFA may include one or more of configuring a passcode application, verifying an email address, verifying a phone number, setting up biometric scans, and the like.

At decision block 614, the file exchange backend 130 determines whether the recipient has been successfully authenticated. If it is determined at the decision block 614 that the recipient has not been successfully authenticated, the process 600 ends. In some cases, the process 600 may include alerting a user (e.g., an administrator) of an unsuccessful attempt to access the packet or files associated with the packet. Alternatively, or in addition, the process 600 may include informing the recipient user of a reason for the unsuccessful attempt to access the packet or files associated with the packet. In other cases, no reason may be provided to the recipient user.

If it is determined at the decision block 614 that the recipient has been successfully authenticated, the process 600 proceeds to the block 610 where, as described above, the file exchange backend 130 provides access to file associated with the packet.

Terminology

Conditional language used herein, such as, among others, "can," "could," "might," "may," "e.g.," and the like, unless specifically stated otherwise, or otherwise understood within the context as used, may be generally intended to convey that certain embodiments include, while other embodiments do not include, certain features, elements and/or states. Thus, such conditional language may be not generally intended to imply that features, elements and/or states may be in any way required for one or more embodiments or that one or more embodiments necessarily include these features, elements and/or states.

Conjunctive language such as the phrase "at least one of X, Y, and Z," unless specifically stated otherwise, may be otherwise understood with the context as used in general to convey that an item, term, etc. may be either X, Y, or Z. Thus, such conjunctive language may be not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Additionally, features described in connection with one embodiment can be incorporated into another of the disclosed embodiments, even if not expressly discussed herein, and embodiments may have the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it may be intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example may be to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps may be mutually exclusive. The protection may be not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

Moreover, while operations may be depicted in the drawings or described in the specification in a particular order, such operations need not be performed in the particular order shown or in sequential order, or that all operations be performed, to achieve desirable results. Other operations that may be not depicted or described can be incorporated in the example methods and processes. For example, one or more additional operations can be performed before, after, simultaneously, or between any of the described operations. Further, the operations may be rearranged or reordered in other implementations, including being performed at least partially in parallel. Those skilled in the art will appreciate that in some embodiments, the actual steps taken in the processes illustrated and/or disclosed may differ from those shown in the figures. Depending on the embodiment, certain of the steps described above may be removed, others may be added.

For purposes of this disclosure, certain aspects, advantages, and novel features may be described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that may be within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure may be not intended to be limited by the specific disclosures of preferred embodiments in this section or elsewhere in this specification, and may be defined by claims as presented in this section or elsewhere in this specification or as presented in the future. The language of the claims may be to be interpreted broadly based on the language employed in the claims and not limited to the examples described in the present specification or during the prosecution of the application, which examples may be to be construed as non-exclusive.

Unless the context clearly may require otherwise, throughout the description and the claims, the words "comprise", "comprising", and the like, may be construed in an inclusive sense as opposed to an exclusive or exhaustive sense, that may be to say, in the sense of "including, but not limited to".

What is claimed is:

1. A method of secure file transfer of a file with limited access duration, the method comprising:
    by a hardware processor of an interactive computing system,
        receiving an indication that a requestor user interacted with an entity link associated with an entity;

outputting an authentication request to obtain authentication information from the requestor user;
receiving the authentication information from the requestor user; and
responsive to successfully authenticating the requestor user based at least in part on the authentication information, the method further comprises:
receiving sender user information of a sender user;
generating a link corresponding to a file repository;
generating a packet, wherein the packet corresponds to a location at the file repository where a file uploaded responsive to interaction with an upload link is stored;
generating a packet access token that comprises a packet identifier associated with the packet;
embedding the packet access token with the link to create the upload link, wherein the upload link is associated with the packet;
outputting the upload link to enable the sender user to access the packet to upload the file to the location at the file repository that corresponds to the packet;
determining that the file has been uploaded to the location at the file repository; and
responsive at least in part to determining that the file has been uploaded to the location at the file repository, alerting a recipient that the file has been uploaded, wherein the recipient is a different user than the requestor user.

2. The method of claim 1, further comprising:
receiving an indication that the sender user interacted with the upload link;
determining that the packet access token embedded with the upload link is a modify packet token, wherein the modify packet token permits a user to modify files associated with the packet; and
responsive to determining that the packet access token is the modify packet token, the method further comprising:
retrieving the packet identifier from the packet access token;
accessing a packet status associated with the packet; and
determining whether the packet status indicates that the packet is empty.

3. The method of claim 2, wherein, responsive to determining that the packet status indicates that the packet is not empty, denying the sender user with access to the packet.

4. The method of claim 2, wherein, responsive to determining that the packet status indicates that the packet is empty, the method further comprises:
receiving the file from a sender computing system;
storing the file at the location at the file repository;
associating the file with the packet;
modifying the packet status to indicate that the packet is not empty;
identifying the recipient associated with the packet; and
alerting the recipient that the file has been uploaded to the file repository.

5. The method of claim 4, further comprising receiving a submit indicator associated with receiving the file from the sender computing system, wherein the packet status is modified to indicate that the packet is not empty in response to receiving the submit indicator.

6. The method of claim 4, further comprising:
generating a view access token that comprises the packet identifier associated with the packet; and
generating a file access link associated with the packet, wherein the file access link includes the view access token, and wherein alerting the recipient includes providing the recipient with the file access link.

7. The method of claim 6, wherein the view access token enables the recipient to view or download the file associated with the packet.

8. The method of claim 7, wherein the view access token does not permit the recipient to upload files to the location at the file repository.

9. The method of claim 6, further comprising:
receiving an indication that the recipient interacted with the file access link;
determining that a packet access token embedded with the file access link is the view access token;
validating the view access token;
responsive to determining that the view access token is valid, authenticating the recipient; and
responsive to determining that the recipient is successfully authenticated, providing access to the file associated with the packet.

10. The method of claim 9, wherein authenticating the recipient comprises:
determining whether the packet requires multifactor authentication; and
responsive to determining that the packet requires multifactor authentication, initiating a multifactor authentication process to authenticate the recipient.

11. The method of claim 9, wherein validating the view access token comprises determining that a time-to-live value associated with the view access token has not expired.

12. The method of claim 9, wherein validating the view access token comprises determining whether a network address associated with a recipient computing system that provided the indication that the recipient interacted with the file access link is on a whitelist.

13. The method of claim 4, wherein associating the file with the packet comprises associating the packet with the location at which the file is stored at the file repository.

14. The method of claim 1, further comprising:
determining that a time-to-live value associated with at least one of the packet or the file has expired; and
deleting at least one of the packet or the file from the file repository.

15. The method of claim 1, wherein, responsive to successfully authenticating the requestor user based at least in part on the authentication information, the method further comprises:
generating an access token at a backend system, wherein the access token is not presented to a user; and
transmitting the access token to a front end system, wherein the access token enables the front end system to communicate with the backend system.

16. The method of claim 15, wherein the access token is associated with a time-to-live value.

17. A system configured to implement a secure file transfer of a file with a limited time duration, the system comprising:
a file repository configured to store a file for at least a limited time duration; and
a hardware processor configured to at least:
receive an indication that a requestor user interacted with an entity link associated with an entity;
output an authentication request to obtain authentication information from the requestor user;
receive the authentication information from the requestor user; and responsive to successfully authenticating the requestor user based at least in part on the authentication information, the hardware processor is further configured to at least:
receive sender user information of a sender user;
generate a link corresponding to a file repository;
generate a packet, wherein the packet corresponds to a location at the file repository where a file uploaded responsive to interaction with an upload link is stored;
generate a packet access token that comprises a packet identifier associated with the packet;
embed the packet access token with the link to create the upload link, wherein the upload link is associated with the packet; and
output the upload link to enable the sender user to access the packet to upload the file to the location at the file repository that corresponds to the packet.

18. The system of claim 17, wherein the hardware processor is further configured to at least:
receive an indication that the sender user interacted with the upload link;
determine that the packet access token embedded with the upload link is a modify packet token, wherein the modify packet token permits a user to modify files associated with the packet; and
responsive to determining that the packet access token is the modify packet token, the hardware processor is further configured to:
retrieve the packet identifier from the packet access token;
access a packet status associated with the packet; and
determine whether the packet status indicates that the packet is empty.

19. The system of claim 18, wherein, responsive to determining that the packet status indicates that the packet is not empty, the hardware processor is further configured to at least deny the sender user with access to the packet.

20. The system of claim 18, wherein, responsive to determining that the packet status indicates that the packet is empty, the hardware processor is further configured to at least:
receive the file from a sender computing system;
store the file at the location at the file repository;
associate the file with the packet;
modify the packet status to indicate that the packet is not empty;
identify a recipient associated with the packet; and
alert the recipient that the file has been uploaded to the file repository.

21. The system of claim 20, wherein the hardware processor is further configured to at least:

generate a view access token that comprises the packet identifier associated with the packet; and
generate a file access link associated with the packet, wherein the file access link includes the view access token, wherein alerting the recipient includes providing the recipient with the file access link, and wherein the view access token enables the recipient to view or download the file associated with the packet.

22. The system of claim 21, wherein the hardware processor is further configured to at least:
receive an indication that the recipient interacted with the file access link;
determine that a packet access token embedded with the file access link is the view access token;
validate the view access token;
responsive to determining that the view access token is valid, authenticate the recipient; and
responsive to determining that the recipient is successfully authenticated, provide access to the file associated with the packet.

23. The system of claim 22, wherein authenticating the recipient comprises:
determining whether the packet requires multifactor authentication; and
responsive to determining that the packet requires multifactor authentication, initiating a multifactor authentication process to authenticate the recipient.

24. The system of claim 22, wherein validating the view access token comprises at least one of:
determining that a time-to-live value associated with the view access token has not expired; or
determining whether an Internet Protocol address associated with a recipient computing system that provided the indication that the recipient interacted with the file access link is on a whitelist.

25. The system of claim 20, wherein the recipient and the requestor user are different users.

26. The system of claim 20, wherein the hardware processor is further configured to at least:
determine that a time-to-live value associated with at least one of the packet or the file has expired; and
delete at least one of the packet or the file from the file repository.

27. The system of claim 17, wherein, responsive to successfully authenticating the requestor user based at least in part on the authentication information, the hardware processor is further configured to at least:
generate an access token at a backend system; and
transmit the access token to a front end system, wherein the access token enables the front end system to communicate with the backend system.

* * * * *